United States Patent
Hjuler

(10) Patent No.: US 8,377,198 B2
(45) Date of Patent: Feb. 19, 2013

(54) GASIFICATION WITH SEPARATE CALCINATION

(75) Inventor: Klaus Hjuler, Farum (DK)

(73) Assignee: FLSmidth A/S, Valby (DK)

( * ) Notice: Subject to any disclaimer, the term of this patent is extended or adjusted under 35 U.S.C. 154(b) by 266 days.

(21) Appl. No.: 12/996,234

(22) PCT Filed: May 12, 2009

(86) PCT No.: PCT/EP2009/055689
§ 371 (c)(1), (2), (4) Date: Dec. 3, 2010

(87) PCT Pub. No.: WO2009/147000
PCT Pub. Date: Dec. 10, 2009

(65) Prior Publication Data
US 2011/0073014 A1    Mar. 31, 2011

(30) Foreign Application Priority Data
Jun. 6, 2008    (DK) ............................ 2008 00778

(51) Int. Cl.
C04B 7/36    (2006.01)
C04B 7/365   (2006.01)
C04B 7/367   (2006.01)

(52) U.S. Cl. ........................................ 106/739

(58) Field of Classification Search ............ 106/739
See application file for complete search history.

(56) References Cited

U.S. PATENT DOCUMENTS

| | | | | |
|---|---|---|---|---|
| 5,216,884 A * | 6/1993 | Holsiepe | ................. | 60/648 |
| 5,349,910 A * | 9/1994 | Hundebol | ................. | 110/346 |
| 6,601,541 B2 * | 8/2003 | Burdis et al. | ................. | 122/4 D |
| 6,749,681 B1 * | 6/2004 | Burdis et al. | ................. | 106/744 |
| 2003/0059735 A1 * | 3/2003 | Burdis et al. | ................. | 432/58 |
| 2009/0101050 A1 * | 4/2009 | Lackner et al. | ................. | 110/216 |
| 2010/0180803 A1 * | 7/2010 | Hansen | ................. | 106/771 |

FOREIGN PATENT DOCUMENTS

| | | |
|---|---|---|
| DE | 3123998 A1 | 4/1982 |
| GB | 2081855 A | 2/1982 |
| GB | 2098305 A * | 11/1982 |

OTHER PUBLICATIONS

Written Opinion of the International Searching Authority of PCT/EP2009/055689.

* cited by examiner

Primary Examiner — Paul Marcantoni
(74) Attorney, Agent, or Firm — Buchanan Ingersoll & Rooney PC

(57) ABSTRACT

A method and an apparatus for manufacturing of cement includes cement raw meal being preheated in a preheater, calcined in a calciner by contact with hot gases which are introduced into the calciner via a gas inlet and being diverted from the calciner via a gas outlet, and where calcined cement raw meal is diverted from the calciner, burned into cement clinker in a kiln and subsequently cooled in a clinker cooler. At least a portion of the calcined cement raw meal diverted from the calciner is heated further in a separate system to a temperature which exceeds the calcination temperature and is subsequently recirculated to the calciner. That at least a portion of the gases which are diverted via the gas outlet of the calciner is removed from the plant with a view to storage underground or other additional treatment.

16 Claims, 3 Drawing Sheets

US 8,377,198 B2

GASIFICATION WITH SEPARATE CALCINATION

CROSS-REFERENCE TO RELATED APPLICATIONS

This application is the United States national stage under 35 U.S.C. §371 of International Application No. PCT/EP2009/055689, filed on May 12, 2009, claiming priority to Danish Application No. PA 2008 00778, filed on Jun. 6, 2008. The entirety of both of these applications are incorporated by reference herein.

FIELD OF INVENTION

The present invention relates to a method for manufacturing cement whereby cement raw meal is preheated in a preheater, calcined in a calciner by contact with hot gases which are introduced into the calciner via a gas inlet and being diverted from the calciner via a gas outlet, and where calcined cement raw meal is diverted from the calciner, burned into cement clinker in a kiln and subsequently cooled in a clinker cooler. The invention also relates to a plant for carrying out the method.

BACKGROUND OF THE INVENTION

In modern cement manufacturing plants, the raw materials are typically heated by heat exchange with exhaust gases from the kiln and/or the calciner. This takes place in a so-called suspension preheater, typically a tower made up of a number of cyclones connected in series. Calcination is typically carried out in a duct section at the bottom of the tower where the temperature and retention time are sufficient for calcination, i.e. the decomposition of limestone, to take place, subject to release of carbon dioxide. The calciner may, viewed in the direction of movement of the material, be installed immediately ahead of the rotary kiln, such as in an ILC installation and/or in the duct with hot air from the cooler, such as in an SLC installation. The calciner is fed with so-called secondary fuel, and combustion hereof is effected by means of oxygen which is in surplus from the kiln or contained in the hot air from the cooler. Typically, a small amount of kiln gases are removed via a bypass to prevent accumulation of certain components in the process. The calcined material is then directed to the kiln, in most cases a rotary kiln, in which the subsequent heating is done in counterflow to exhaust gases from a primary burner. After being burned in the rotary kiln, the clinker is directed to a clinker cooler in which the clinker is cooled to a level around 100 degrees Celcius by means of atmospheric air.

The energy consumed in connection with the cement production process at a modern plant, as described above, is approximately 3 MJ/kg clinker. By comparison, the theoretical minimum energy consumption is approximately 1.7 MJ/kg. The difference between the actual and the theoretical energy consumption is primarily due to loss from hot surplus air from the clinker cooler and heat loss from the exhaust gases which are diverted from the preheater. The specific emission of carbon dioxide is approximately 1 kg $CO_2$/kg clinker, of which approximately one half relates to the limestone contained in the cement raw meal, whereas the other half relates specifically to the fuel. It is estimated that the contribution made by cement manufacturing processes to the global human-caused emissions of the greenhouse gas carbon dioxide is approximately 5 percent, and, therefore, it would be highly desirable to reduce this level.

Some plants utilize a portion of the heat content in the surplus air from the cooler and the exhaust gases from the preheater to produce electricity, so-called co-generation. However, the available amount of energy is at a relatively modest level, typically on the order of 5-10 MW heat for a plant with a capacity rating of 5000 t clinker/24-h, corresponding to 3-6% of the rated thermal input. Also, the heat available will be of low grade, i.e. its efficiency in relation to electricity production will be relatively small, i.e. at a level around 15-20%. Because of these factors, the benefits gained by setting up a co-generation plant will in many cases not be commensurate with the costs involved.

SUMMARY OF THE INVENTION

It is the purpose of the present invention to provide a method, as well as a plant, for manufacturing cement whereby the total amount of carbon dioxide released to the atmosphere is significantly reduced.

This is obtained by a method characterized in that at least a portion of the calcined cement raw meal diverted from the calciner is heated further in a separate system to a temperature which exceeds the calcination temperature, and being subsequently recirculated to the calciner, and in that at least a portion of the gases which are diverted via the gas outlet of the calciner is removed from the plant with a view to storage in the underground or other additional treatment.

Hence it is ensured that at least a portion of the heat volume required for the calcination process can be supplied to the calciner indirectly in the form of hot calcined cement raw meal, which entails that the calciner does not necessarily require direct input of fuel and air as required for prior art designs. The carbon dioxide released during the calcination process can therefore be diverted from the calciner in a substantially pure form which is suitable for storage in the underground or other additional treatment. The carbon dioxide emission to the atmosphere as result of the cement manufacturing process can thus be reduced by 50 percent or more, and the plant owner can obtain savings with respect to the purchase of emission licenses. It is further obtained that a significant portion of the energy input to the process will be in the form of surplus heat in the gases from the calciner at a relatively high temperature of around 850 degrees Celcius which can be utilized for producing electricity with a high level of efficiency, i.e. around 40-45 percent. Hence, the investment in a co-generation plant will be an attractive proposition.

The gases from the calciner may also be fed with fuel, thereby making it possible to produce so-called synthesis gas, or syngas, which substantially contains carbon monoxide, hydrogen, carbon dioxide and water vapors. Syngas is a combustible gas which may advantageously be utilized as a fuel or for producing electricity or as the basis for the synthesis e.g. of methanol. Finally, the gases from the calciner may be utilized for heating cement raw meal in a preheater which is substantially nitrogen-free, with subsequent discharge of the gases for storage in the underground or other additional treatment.

In one embodiment a portion of the cement raw meal from the calciner may be brought into contact with kiln gases which typically have a temperature of at least 1100 degrees Celsius. This may take place by suspending a portion of the calcined cement raw meal in a stream of exhaust gases from the kiln, e.g. in a riser duct, whereby it is heated to a temperature exceeding the calcination temperature before it is subsequently separated off in a cyclone from which it is recirculated to the calciner. The heat content in all the gases being diverted from the calciner is utilized for producing electricity, e.g. in a steam boiler or a similar device, whereupon the cooled gases are removed from the plant for storage in the underground or other additional treatment.

Because the transfer of heat from the cement raw meal which is recirculated to the calciner to the cement raw meal from the preheater will be difficult to achieve without a certain amount of gases for suspending the cement raw meal in the calciner, a portion of the gases being diverted from the calciner, and being substantially made up of carbon dioxide, may advantageously be recirculated and re-introduced into the calciner via its gas inlet. In a second embodiment a portion of the gases being diverted from the calciner is therefore recirculated to the calciner, whereas the heat content in the remaining portion is utilized to produce electricity, e.g. in a steam boiler or a similar device, after which the cooled gases are removed from the plant for storage in the underground or other additional treatment.

In a third embodiment, the heat content in all the gases being diverted from the calciner may be utilized for producing electricity, e.g. in a steam boiler or a similar device. From the steam boiler or a similar device a portion of the cooled gases is recirculated to the calciner whereas the remaining portion of the cooled gases is removed from the plant for storage in the underground or other additional treatment. In this embodiment, the gases which are recirculated to the calciner may advantageously be re-heated prior to being introduced into the calciner, which, for example, may be done through heat exchange with the clinker in the clinker cooler. Because the heat content in the clinker in this embodiment is utilized for heating the gases which are to be re-introduced into the calciner, there will be no transfer of heat from the clinker to the kiln as is the case for prior art designs. This means that the temperature conditions in the kiln can be regulated independently of the conditions in the clinker cooler.

In a fourth embodiment the heat content in all the gases being diverted from the calciner may be utilized for preheating the cement raw meal in a substantially nitrogen-free preheater. From the preheater a portion of the cooled gases is recirculated to the calciner whereas the remaining portion of the cooled gases is removed from the plant for storage in the underground or other additional treatment. In this embodiment the gases being recirculated to the calciner may advantageously be re-heated prior to being introduced into the calciner which, as mentioned above, may be done by heat exchange with the clinker in the clinker cooler. This embodiment may be relevant in cases where it is not desirable to produce electricity.

In all the aforementioned embodiments, water and/or water vapors may advantageously be supplied to the calciner and/or the gases being diverted from the calciner and/or the gases being recirculated to the calciner. The presence of water vapors will reduce the concentration of carbon dioxide, making it possible to achieve a faster calcination process at a given temperature, alternatively at the same rate at a lower temperature. In this embodiment the gases from the calciner contain substantial amounts of water vapors which may condense subject to cooling in the steam boiler or a similar device. The condensed water can subsequently be re-used.

In all the aforementioned embodiments, it may also be advantageous to supply fuel to the calciner and/or the gases being diverted from the calciner and/or the gases being recirculated to the calciner. Carbon dioxide and, where relevant, water vapors may react with (gasification) the input fuel, causing syngas to be formed. This syngas may be combusted completely or partially with oxygen and be directed to the calciner and/or it may be utilized to produce electricity and/or it may be used as the basis for synthesis of e.g. methanol. The gasification may take place in a gasifier unit and/or in a combined gasifier and boiler unit and/or in the calciner per se.

Embodiments of a plant for carrying out the method according to the invention may comprise a preheater for preheating cement raw meal, a calciner for calcining preheated cement raw meal, said calciner comprising a gas inlet and a gas outlet, a kiln for burning cement clinker, and a cooler for cooling the cement clinker, and being characterized in that it comprises an apparatus for further heating of at least a portion of the calcined cement raw meal from the calciner in a separate system, an apparatus for separating the cement raw meal thus subjected to further heating, an apparatus for recirculating the separated cement raw meal to the calciner, and an apparatus for extracting from the plant at least a portion of the gases being diverted from the calciner with a view to storage in the underground or other additional treatment.

The plant may further comprise an apparatus for producing electricity utilizing the gases diverted from the calciner as well as an apparatus for preheating cement raw meal in a substantially nitrogen-free preheater.

The plant may further comprise an apparatus for directing a portion of the gases diverted from the calciner back to the gas inlet of the calciner as well as an apparatus for bringing the gases into contact with hot clinker.

The plant may further comprise an apparatus for feeding water and/or water vapors to the calciner and/or the gases being diverted from the calciner and/or the gases being recirculated to the calciner, as well as an apparatus for input of fuel to the calciner and/or the gases being diverted from the calciner and/or the gases being recirculated to the calciner.

Other details, objects, and advantages of the invention will become apparent as the following description of certain present preferred embodiments thereof and certain present preferred methods of practicing the same proceeds.

BRIEF DESCRIPTION OF THE DRAWINGS

The invention will now be described in further detail with reference to.

It should be understood that like reference numbers in the FIGS. 1-3 may refer to like elements throughout the below description of embodiments of the plant for making cement and methods of making cement.

DETAILED DESCRIPTION OF PRESENT PREFERRED EMBODIMENTS

Figure 1:
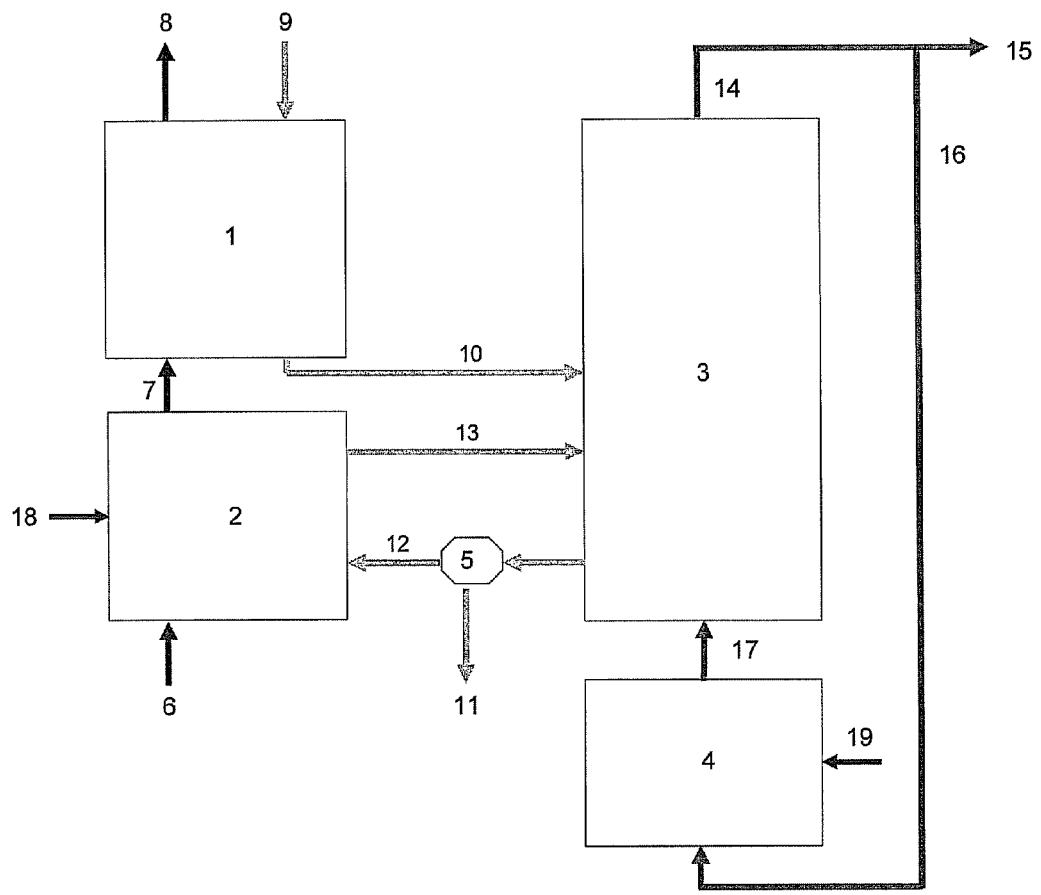
FIG. 1, which illustrates a basic diagram of a process for making cement according to an embodiment of the invention, and FIG. 2, which is a diagram of an embodiment of the invention, and FIG. 3, which illustrates a flow diagram of an embodiment of the present invention.

As may be appreciated from FIG. 1 cement raw meal 9 is preheated in a preheater 1 by use of hot gases 7. The preheated cement raw meal 10 is directed to a calciner 3 in which the cement raw meal is calcined. A portion of the gases 14 from the calciner 3 is diverted 15, whereas a second portion 16 is directed to a gasifier 4 which is fed with fuel and, where relevant, oxygen 19. The gases 17 from the gasifier 4 are recirculated to the calciner 3. Calcined cement raw meal from the calciner 3 is directed to a splitter gate or similar device 5 from which a portion of the calcined cement raw meal 11 is directed to a kiln (not shown), and another portion 12 is directed to a riser duct 2. The riser duct 2 receives exhaust gases 6 from a kiln (not shown) and secondary fuel and, where relevant, air 18. The calcined cement raw meal 13 is separated from the exhaust gases 6 by means of a cyclone or a similar device and recirculated to the calciner 3.

Figure 2:
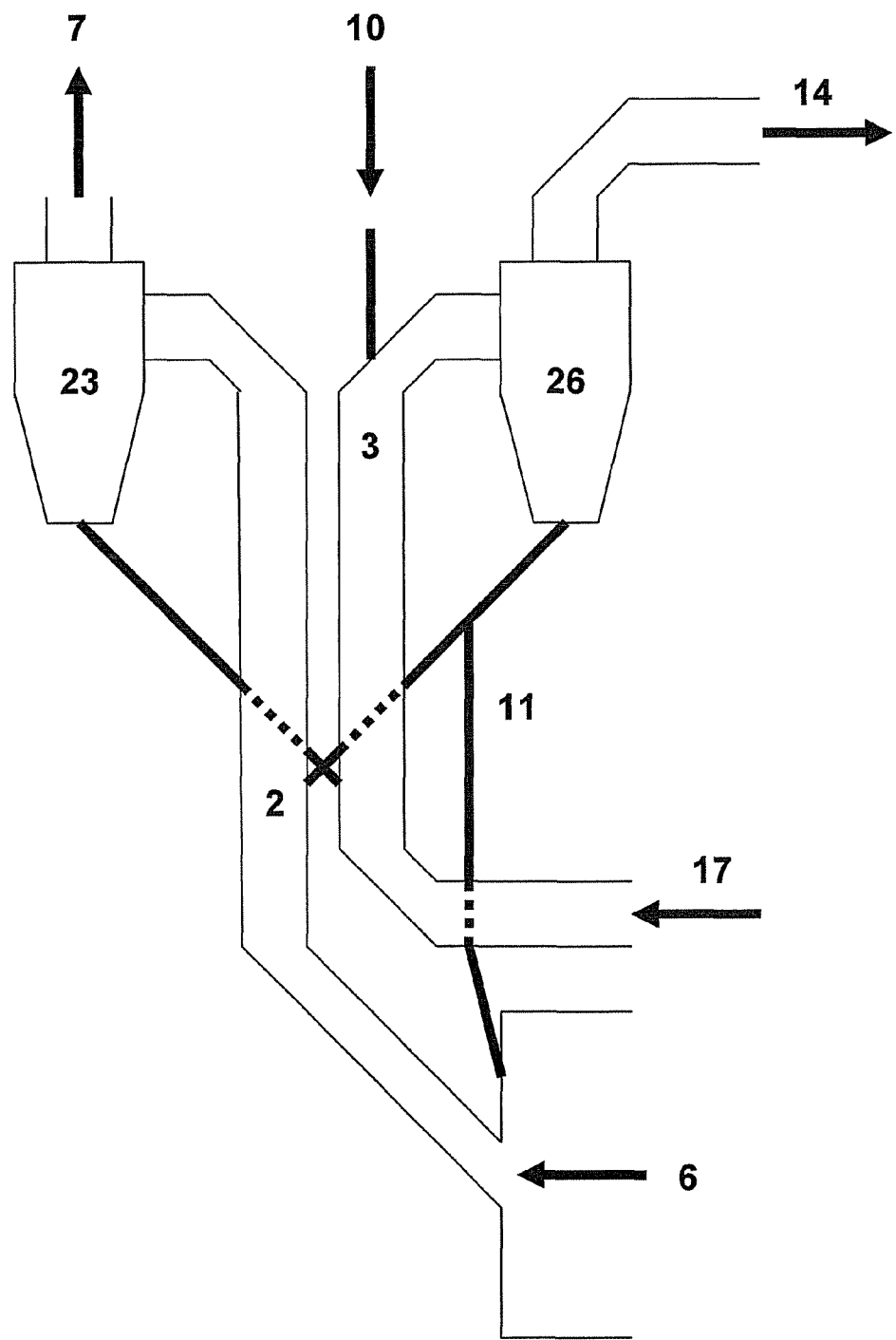

As may be understood from FIG. 2, the heat transfer from kiln exhaust gases 6 to calcined cement raw meal from the calciner 3 can in a simplified manner be achieved by means of two parallel cyclone separators. Preheated cement raw meal 10 is brought into contact with a hot gas stream 17 in a duct 3 causing the cement raw meal to be calcined. The calcined cement raw meal is separated from the gases 14 in a cyclone 26. A portion of the hot gases 14 is recirculated 17 to the duct 3. The calcined cement raw meal from the cyclone 26 is split into two flow streams by means of a splitter gate or a similar device (not shown), with one flow stream 11 being directed to a kiln whereas the second flow stream is directed to a duct 2. In the duct 2 the calcined cement raw meal is brought into contact with hot kiln exhaust gases 6, with the material subsequently undergoing separation in the cyclone 23. The separated material is recirculated to the duct 3.

Figure 3:
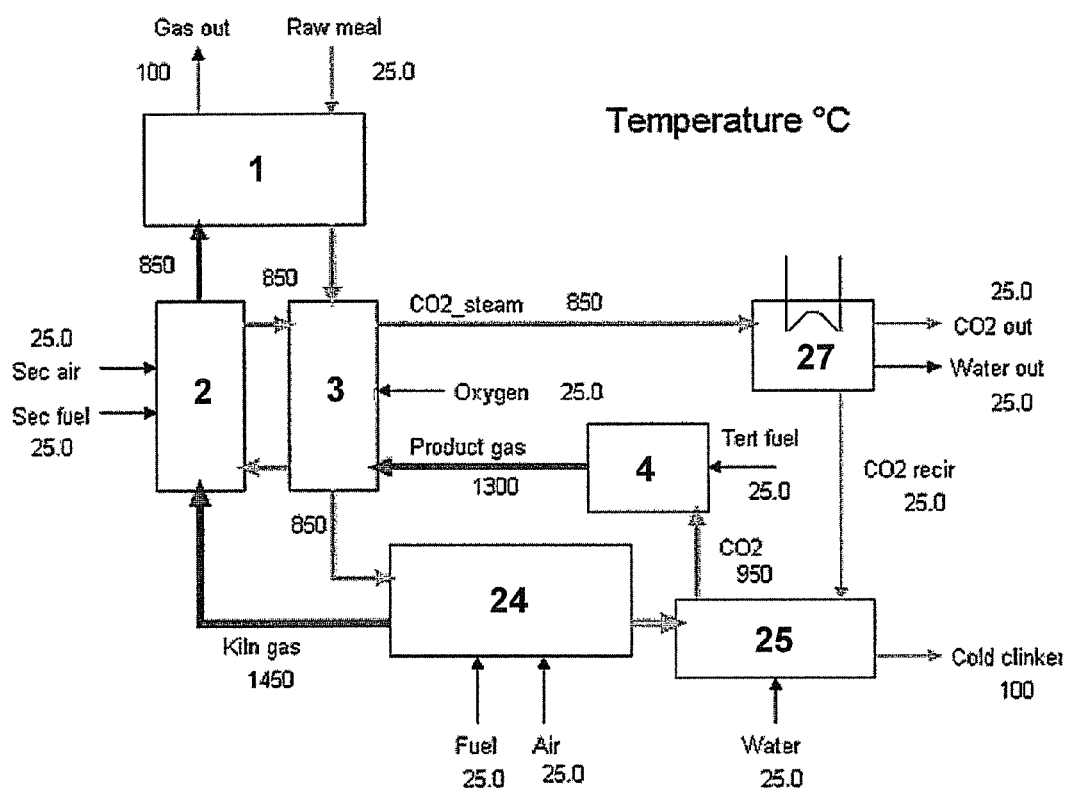

FIG. 3 illustrates a flow diagram with temperature conditions indicated for gas- and material flows in a preferred embodiment of the invention. The cement raw meal is preheated in the preheater 1 and is directed to the calciner 3. The hot gases from the calciner 3 are directed to the boiler 27 where the energy contained in the gases is utilized e.g. for producing electricity. A portion of the cooled gases is subsequently directed to the clinker cooler 25 whereas the remaining gases are led away from the plant. In the clinker cooler 25 the gases are re-heated through heat exchange with the clinker from the kiln 24, and, where relevant, water and/or water vapors may be added to adjust the concentration of carbon dioxide. The hot carbon dioxide laden gases are directed to a gasifier 4 where the gases are used for gasification of solid and/or liquid fuel being fed to the gasifier. The syngas thus produced is combusted completely or partially subject to simultaneous input of oxygen and the gases are passed on to the calciner 3. A portion of the calcined cement raw meal from the calciner 3 is simultaneously brought into contact with exhaust gases from the kiln 24 in a duct 2, and the material is subsequently separated and recirculated to the calciner 3. Fuel and air are supplied to the duct 2 and the kiln 24.

As a consequence hereof, at least a portion of the heat volume required for calcination can be supplied to the calciner indirectly in the form of hot calcined cement raw meal. This means that the calciner will not necessarily need direct input of fuel and air as required for prior art designs. The carbon dioxide released during calcination can therefore be diverted from the calciner in a substantially pure form which is suitable for underground storage or other additional treatment. The carbon dioxide emission to the atmosphere as result of the cement manufacturing process can thus be reduced by 50% or more, and the plant owner can obtain savings with respect to the purchase of emission licenses. It is further obtained that a significant portion of the energy added to the process is available in the form of surplus heat in the gases from the calciner at a temperature level which can be utilized to produce electricity with a high degree of efficiency. Hence, the investment in a co-generation plant will be a sound proposition. The gases from the calciner can also be utilized for producing so-called syngas which may advantageously be used as a fuel or as the basis for synthesis e.g. of methanol.

While certain present preferred embodiments of the above discussed method and plant for making cement and certain embodiments of methods of practicing the same have been shown and described, it is to be distinctly understood that the invention is not limited thereto but may be otherwise variously embodied and practiced within the scope of the following claims.

The invention claimed is:

1. A method for manufacturing cement comprising:
preheating cement raw meal in a preheater,
calcining the cement raw meal in a calciner via contact with hot gases which are introduced into the calciner via a gas inlet and are diverted from the calciner via a gas outlet,
diverting the calcined cement raw meal from the calciner,
burning the cement raw meal into cement clinker in a kiln,
cooling the cement raw meal in a clinker cooler, and
wherein at least a portion of the calcined cement raw meal diverted from the calciner is heated further in a separate apparatus to a temperature which exceeds a calcination temperature of the diverted calcined cement raw meal and is subsequently recirculated to the calciner, and
wherein at least a portion of the gases which are diverted via the gas outlet of the calciner is removed for storage underground or for other additional treatment.

2. The method of claim 1 wherein at least a portion of the gases being diverted from the calciner is utilized for producing electricity.

3. The method of claim 2 wherein at least a portion of the gases utilized for producing electricity is recirculated to the calciner and wherein a remainder of the gases utilized for producing electricity is removed from a plant for storage underground or for other additional treatment.

4. The method of claim 1 wherein the at least a portion of the gases being diverted from the calciner is utilized for preheating cement raw meal in a nitrogen-free preheater.

5. The method of claim 4 wherein at least a portion of the gases utilized for preheating cement raw meal is recirculated to the calciner and a remainder of the at least a portion of the gases utilized for preheating cement raw meal is removed from a plant for storage underground.

6. The method of claim 3 wherein the gases being recirculated to the calciner are brought into contact with clinker in the clinker cooler.

7. The method of claim 1 wherein at least one of water and water vapor is added to at least one of the calciner and the gases which are diverted from the calciner.

8. The method of claim 3 wherein at least one of water and water vapor is added to the gases which are recirculated to the calciner.

9. The method of claim 1 wherein fuel is supplied to at least one of the calciner and the gases which are diverted from the calciner.

10. The method of claim 3 wherein fuel is supplied to the gases which are recirculated to the calciner.

11. The method of claim 5 wherein at least one of water and water vapor is added to the gases which are recirculated to the calciner.

12. The method of claim 6 wherein at least one of water and water vapor is added to the gases which are recirculated to the calciner.

13. The method of claim 5 wherein the gases being recirculated to the calciner are brought into contact with clinker in the clinker cooler.

14. The method of claim 5 wherein fuel is supplied to the gases which are recirculated to the calciner.

15. The method of claim 6 wherein fuel is supplied to the gases which are recirculated to the calciner.

16. The method of claim 8 wherein fuel is supplied to the gases which are recirculated to the calciner.

* * * * *